June 7, 1938.  C. ECKER  2,119,877
INTERNAL COMBUSTION ENGINE
Filed Jan. 28, 1935  4 Sheets-Sheet 1
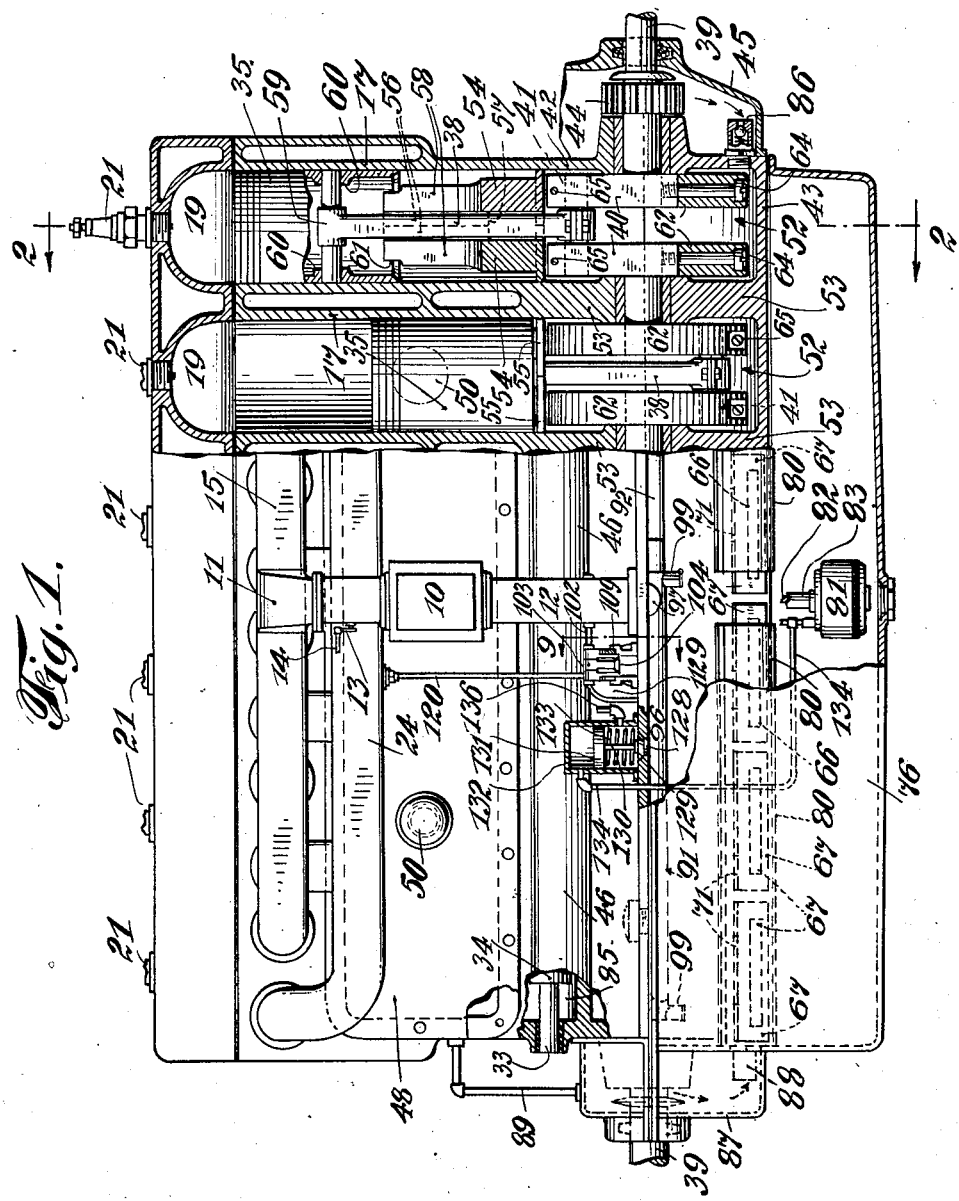
Charles Ecker
INVENTOR.
BY
ATTORNEY.

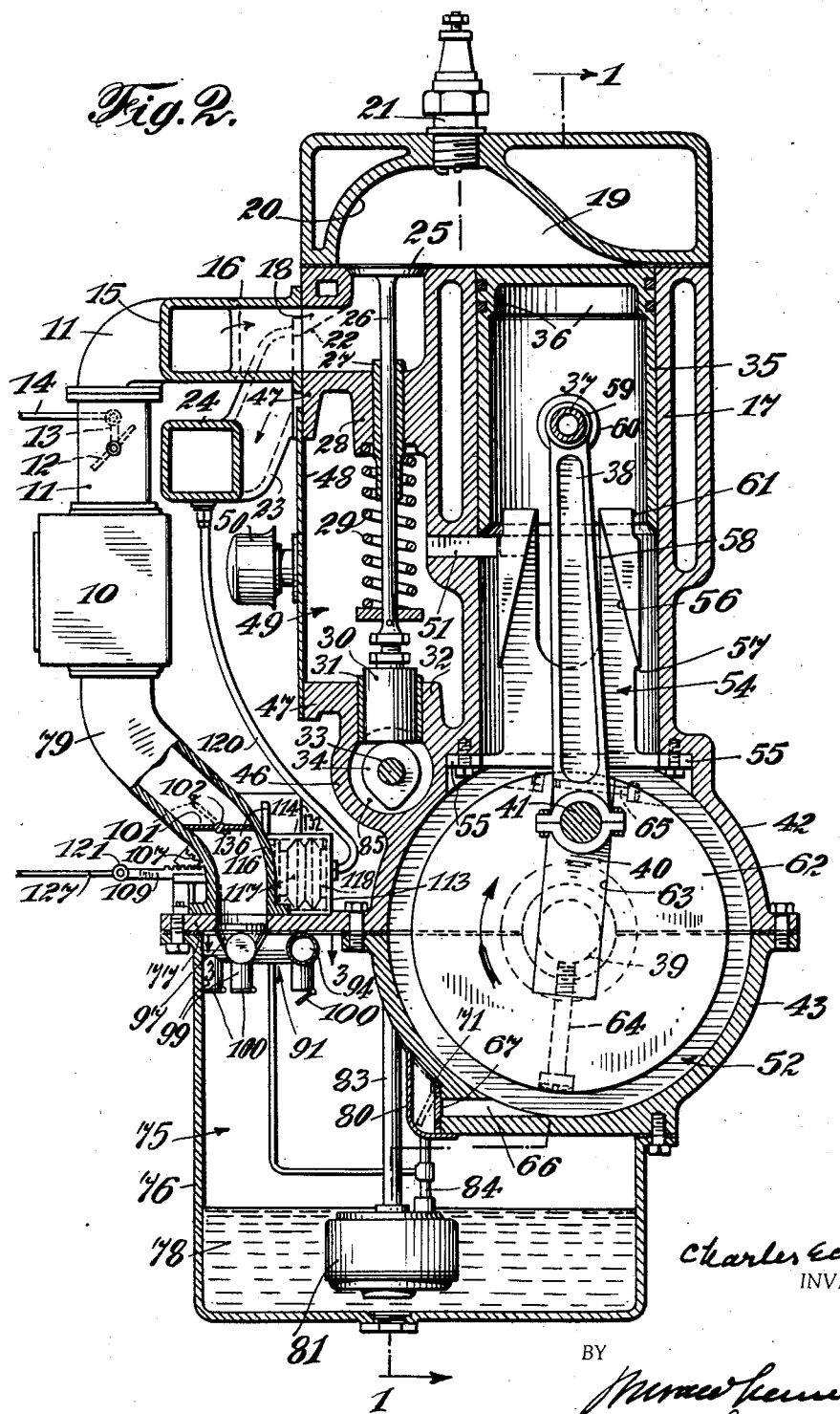

June 7, 1938.  C. ECKER  2,119,877
INTERNAL COMBUSTION ENGINE
Filed Jan. 28, 1935  4 Sheets-Sheet 3
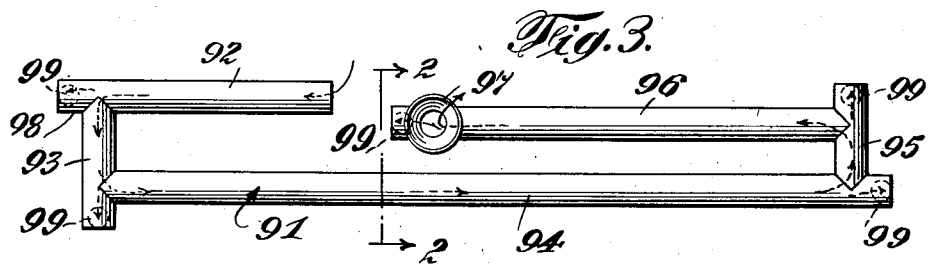
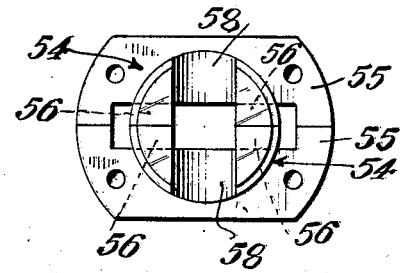
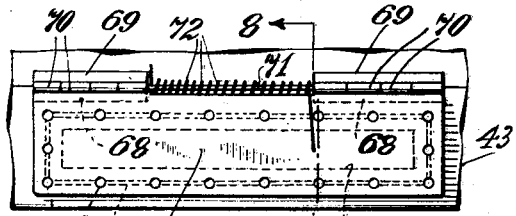
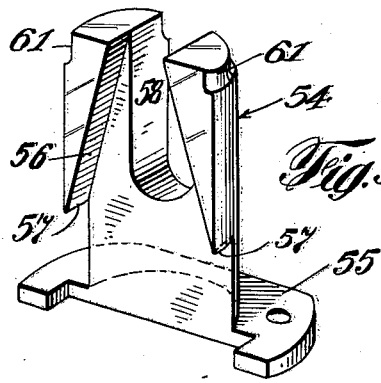
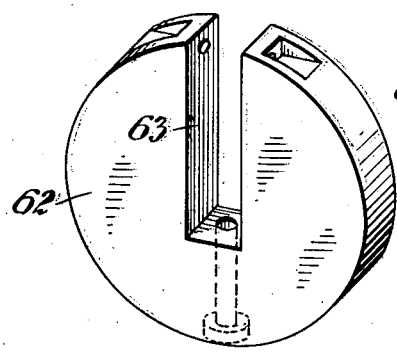
Charles Ecker
INVENTOR.
BY
ATTORNEY.

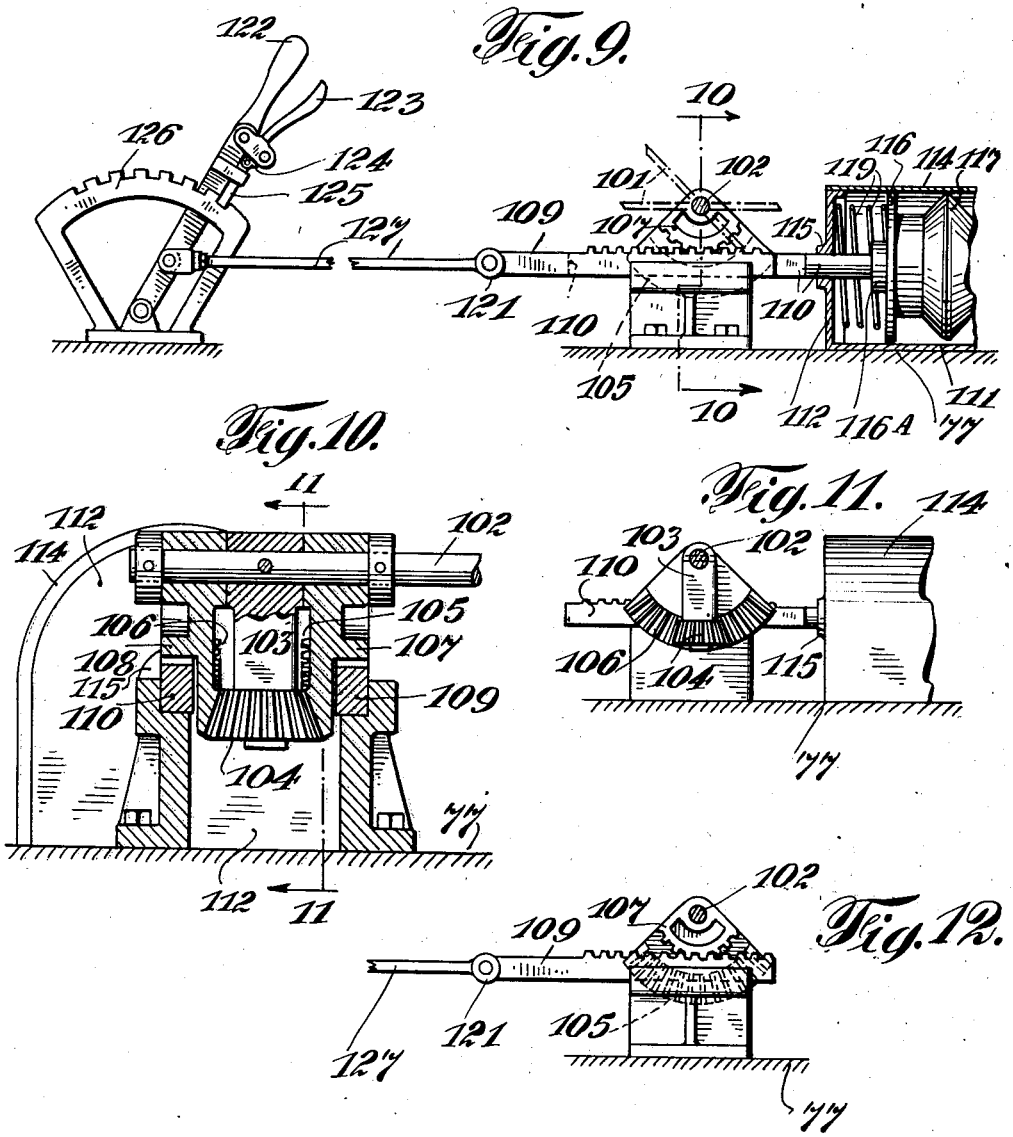

Patented June 7, 1938

2,119,877

UNITED STATES PATENT OFFICE 2,119,877

INTERNAL COMBUSTION ENGINE

Charles Ecker, New York, N. Y., assignor of one-half to Simon Marmorek, New York, N. Y.

Application January 28, 1935, Serial No. 3,699

17 Claims. (Cl. 123—59)

My invention relates to internal combustion engines and refers particularly to a multi-cylinder four-cycle engine having a precompression device or supercharger incorporated therein as an important feature of the engine construction itself.

While self-supercharging engines have been heretofore proposed, none of these has come into general or extensive use. This, as well as the disclosed construction of various engines of this kind, indicates that none of these proposed engines fulfills the practical requirements.

Among the desirable general objects to be attained by my invention as compared with usual and previously proposed internal combustion engines are the following:—

High efficiency at low engine speeds as well as also at higher speeds.

A high degree of engine efficiency, either at sea level or in the rarefied atmosphere of high altitudes, as well as also under other more or less varying atmospheric conditions.

The provision of combined automatic and manual control for regulating the operation of the engine.

Elimination of friction-producing power-consuming moving parts such as heretofore have commonly been added to supercharged engines, thereby to effect supercharging precompression with economy of power.

Reduction of vibration and wear to less than ordinarily takes place.

A large increase in engine power with a substantial decrease in fuel consumed.

Maintaining relatively low crank-case and oil temperatures.

Preventing the escape of disagreeable and noxious vapors from the engine.

A simple construction which is economical to manufacture and is substantially silent in operation, so far as the parts involved in my invention are concerned.

Other objects and intended advantages of my invention will be evident later.

It is well established that a supercharged engine is, under all circumstances of atmospheric pressure, much more efficient, delivering greatly increased power for its size and weight while consuming less fuel.

At the present stage of development, without my invention, the use of supercharged engines is limited in the usual practice to high altitude flights of specially equipped aircraft, particularly airplanes, and specially equipped racing cars in the case of automobiles. In each of the special instances mentioned, a separate supercharging device is employed as an attachment and driven by power taken from the engine. Commonly such a supercharger has a rotary air impeller driven at high speed from one of the rotating shafts of the engine through a train of multiplying gears.

Such a supercharging device has no appreciable efficiency unless it is driven at a high speed. The gears through which it is driven wear out quickly, requiring frequent replacements. The air impeller produces a loud whining noise. Considerable power is required to drive it, by reason of which it is a wasteful extra load upon the engine.

The exigencies of the mentioned instances require the use of superchargers. In such instances their above noted objectionable characteristics become of secondary importance, but nevertheless are still present and highly objectionable.

It will now be realized that such a supercharger is not suitable for use upon the engine of an ordinary automobile. Also that it is not practicable for use upon any internal combustion engine where it is necessary to run the engine at widely varying speeds and especially at low speeds, such as with a usual automobile or with a marine engine.

Accordingly, a further object on my invention is the provision of a self-supercharging internal combustion engine which will be free from all of the mentioned disadvantages as well as others.

The general nature of my invention, as carried out in a practical construction, is as follows:—

An initial air intake chamber is provided which is common to all of the engine cylinders and is in free communication with the atmosphere. Each time an engine piston ascends it draws in beneath it a supply of air from this chamber. This air is received into the cylinder beneath the piston and into an air-tight crank-case compartment, of which there is one for each cylinder.

Each time a piston descends, which in a four-cycle engine is twice for each of its power strokes, it compresses this received air. Means are provided for limiting or restricting the compression space to an extent which will produce the desired maximum amount of compression. This compressed air, together with oil in the crank-case, is delivered into a storage chamber which is common to all of the crank-case compartments.

This precompressed air in the storage chamber is eventually delivered by its own pressure into an intake manifold of the engine, after passing through various interposed instrumentalities. This compressed air on its way to the intake manifold first passes through a suitable oil separator. Next it passes a regulating valve which determines the amount of and pressure of the compressed air which is to be allowed to pass into the intake manifold. This regulating valve is subjected at all times to automatic control and also is adapted to be independently manually operated.

The varying pressure in the exhaust manifold of the engine automatically operates this regulating valve. The amount of precompressed air, of more or less reduced pressure after it has passed through this regulating valve, is passed through a carburetor and a throttle valve to the intake manifold of the engine.

Means are provided which operate automatically when the engine stops running, then to vent the compressed air from the storage chamber, for reasons which will appear later. Also the construction of the engine is such that the valve stems of the intake and exhaust valves are cooled by the incoming fresh air, that the heated air within the hollow piston will be displaced and replaced by cooler air, and that odorous gasoline fumes cannot escape from the engine, but are used therein.

The internal combustion engine of my invention further includes various features of construction and combination of parts, as will clearly appear from the following particular description and appended claims, taken in connection with the accompanying drawings illustrating one form of my invention and in which similar parts are designated by similar numerals.

Figure 1 is in part a broken side elevation and in part a vertical section on the line 1—1 of Figure 2, of an internal combustion engine embodying my invention.

Figure 2 is an enlarged vertical section on the lines 2—2 of Figures 1 and 3.

Figure 3 is a plan view of an oil separator, indicated by the section line 3—3 in Figure 2 and turned 90 degrees in a clockwise direction.

Figure 4 is a plan view of a joined pair of similar stationary filler members which are adapted to be disposed within the lower end portion of each engine cylinder.

Figure 5 is a perspective face view of one of these filler members.

Figure 6 is a perspective view of a crank-case filler carried by the crank-shaft to rotate therewith, of which two are adapted to be disposed within each crank-case compartment.

Figure 7 is a further enlarged broken elevation of a crank-case check valve of the flap type, one of which is provided for each crank-case compartment.

Figure 8 is a yet further enlarged vertical section on the line 8—8 of Figure 7.

Figure 9 is an enlarged broken elevation as viewed in part from the line 9—9 in Figure 1, showing operating means for a regulating valve.

Figure 10 is a further enlarged vertical section on the line 10—10 of Figure 9.

Figure 11 is a vertical section on the line 11—11 of Figure 10.

Figure 12 is a view similar to Figure 9 with parts omitted for clarity.

Referring to the particular self-supercharging internal combustion engine of my invention which is illustrated in the accompanying drawings, it is to be understood that my invention may be embodied in other forms, also that component parts thereof may be more or less modified, while still carrying out my invention in a practically workable construction and as defined in the appended claims.

Those principal features of the four-cycle engine shown in the drawings which remain substantially unchanged from the usual practice will be first briefly mentioned as a basis for the combining of cooperating features of my invention therewith and with one another.

It will be clear from Figure 1 that my invention is shown as incorporated into a six-cylinder engine, although the particular number of cylinders is immaterial to my invention.

In carrying out my invention, as described later, precompressed air under suitable pressure passes into and through an atmospherically airtight carburetor 10 which may be of a usual or any suitable construction, unnecessary to illustrate in detail. The carbureted mixture of air and fuel passes from the carburetor 10 through a feed pipe 11. This pipe 11 has therein a usual butterfly throttle valve 12 adapted to be operated in the usual way by means of a lever arm 13 to which an operating rod 14 is connected.

The feed pipe 11 opens into a usual intake manifold 15 from which feed branches 16—16 for the engine cylinders 17—17 open respectively into intake ports 18—18 formed through the cylinder block. Each intake port 18 opens into a usual combustion chamber 19 for each of the cylinders 17—17. These combustion chambers 19—19 are formed in a usual cylinder head 20, which, as usual, carries a spark plug 21 for each of these combustion chambers.

Each combustion chamber 19 is provided with a usual exhaust port 22 leading into a branch 23 of a usual exhaust manifold 24. Each inlet port 18 is controlled by a usual intake valve 25, while each exhaust port 22 is controlled by a usual exhaust valve (not shown) which is similar to the intake valve 25. Each intake valve 25 and also similarly each exhaust valve has a usual valve stem or rod 26 passing downwardly to the outer side of the cylinder block through a guide sleeve 27 fixed in a bearing flange 28 common to all of the cylinders 17—17. The valve stem 26 is provided with a usual valve-closing spring 29 below the flange 28.

Each valve stem 26 terminates in a usual adjustable lower end piece 30 guided through a sleeve 31 fixed in a bearing 32, these bearings being spaced apart, with open spaces between them, in a usual manner, not illustrated. The usual cam-shaft 33 carries a usual valve-opening cam 34 for each of the valve stem end pieces 30—30.

The engine pistons 35—35 are shown as of a usual form, each being hollow or tubular, opening downwardly, closed at the top, adjacent to which it is of somewhat reduced internal diameter, providing a thickened shoulder-forming annular portion 36. Each cylinder 35 carries a wrist-pin 37 therein forming a journal for a connecting rod 38.

A substantially usual crank-shaft 39 includes, for each cylinder 17, a pair of crank-arms 40—40 connected together by a crank-pin 41 which carries the lower end of the connecting rod 38. Each cylinder 17 opens downwardly into an airtight crank-case comprising an upper half part 42 and a lower half part 43, as is usual in this particular respect. The extended front end portion of the crank-shaft 39 carries a gear 44 which is one of a usual set of timing gears for driving the cam shaft 33. These timing gears are enclosed within a substantially usual air-tight timing gear housing 45.

The features of construction which are involved more particularly in my invention, as carried out in combination with the above described substantially usual features, will now be described, in the form of my invention which is particularly illustrated in the accompanying drawings.

The cam-shaft 33, with its cams 34—34, is provided with a housing 46 which opens upwardly between the guide bearings 32—32, as is usual, but is different in the respect that it has no direct communication with the crank-case 42—43, the purpose of which will be clear later.

A continuous outer flange 47 formed on the engine block extends longitudinally substantially throughout the length of the engine, outwardly from all of its cylinders 17—17. This flange 47 has longer upper and lower parallel portions extending outwardly respectively beyond the top of the upper guide flange 28, beneath the cylinder ports 18—18 and 22—22, and outwardly from the upper portion of the cam shaft housing 46, and has shorter vertical end portions of which that at the rear of the engine is shown in Figure 1, while that at the front end of the engine is similar.

An outer cover 48 is tightly secured upon this flange 47 and forms inwardly from it a closed chamber 49 which houses therein the lower portions of the valve stems 26—26 together with their springs 29—29. In carrying out my invention, this chamber 49 constitutes an initial air-intake chamber or manifold chamber which extends longitudinally along the side of the engine and which is common to all of the engine cylinders 17—17, thus constituting a collective intake passageway.

This air-intake chamber 49 is in communication with the atmosphere through the intermediary of one or more air cleaners or filters 50—50, shown as two in number, and as mounted upon the cover plate 49. These air cleaners 50—50 are similar and are of a usual or standard form, such as heretofore has been commonly used upon the carburetor intake. They serve also as intake silencers, as usual.

In the particular construction shown, each cylinder 17 is provided with an air-intake port 51 opening through its wall into the air-intake chamber 49. Each of these ports 51—51 opens from the air-intake chamber into a cylinder 17 at a point immediately below the lower edge of the skirt portion of the piston 35 when the latter is at the upper limit of its stroke, as is shown in Figure 2. When the piston 35 descends to its lowermost position, as is shown for the second cylinder 17 in Figure 1, its lower edge comes substantially flush with the lower end of its cylinder. The air pressure in the intake chamber 49 and in the crank-case compartment 52 will then be substantially equal.

Since the piston 35 is of greater length than the distance from the upper limit of the port 51 to the lower edge of the piston 35 in the lowermost position of the latter, this port 51 will then be covered and closed by the piston 35, and will only be open when the piston is at, or closely adjacent to, its uppermost position. The reason for and manner of operation of these cylinder ports 51—51 will clearly appear later.

As a cooperating feature in the carrying out of my invention, the crank-case 42—43 is divided longitudinally thereof into separate airtight crank-case chambers or compartments 52—52, one of which is individual to each of the cylinders 17—17, by means of vertical partitions 53—53. For convenient manufacture, each of these crank-case partitions 53—53 has an upper half part formed with the upper crank-case part 42 and a lower half part formed with the lower crank-case part 43, as indicated in Figures 1 and 2. It will now be clear, with regard to each of the cylinders 17—17, that when its piston 35 ascends it will create a partial vacuum within it, beneath it in its cylinder and also within the corresponding individual crank-case compartment 52.

When the lower end of any piston 35 opens the air-inlet port 51, then air of only slightly less than atmospheric pressure will pass from the initial intake manifold chamber 49 through this open cylinder port 51 into the mentioned partially vacuumized space within this piston, beneath it within the lower part of the cylinder 17, and within its individual crank-case compartment 52, as will be clear from Figure 2. The reason in the particular internal combustion engine shown, for thus creating this initial partial vacuum and then filling the vacuumized space with air at substantially atmospheric pressure will be made clear later.

The draft of air thus produced through the initial intake chamber 49 has a desirable cooling effect upon the valve stems 26, both for the intake valves 25 and the mentioned exhaust valves.

When the piston 35 descends, as soon as it has closed the cylinder port 51, it will begin to compress the air within it, beneath it in the cylinder 17, and in its crank-case compartment 52, the limit of this compression being reached when the piston 35 is at the lowermost limit of its downward stroke, as is shown in Figure 1 for the second cylinder 17 and its piston 35. It is obvious that the compression space utilized is within the hollow piston 35, within the cylinder 17 below the lower end of this piston, and within the individual crank-case compartment or chamber 52.

Since the piston 35 must always have the same amount of displacement, it is evident that reduction in the size of this compression space will correspondingly increase the maximum final compression of the air trapped therein by the piston 35, when the latter has reached the lowermost limit of its stroke.

In carrying out my invention it is desirable, as will clearly appear later, to have this compressed air at a higher pressure than that at which it is finally admitted into the intake manifold 15, and thence through means already described into the respective combustion chambers 20—20, when their intake valves 25—25 are open. In the particular engine shown in the drawings, this mentioned precompression space is shown as reduced substantially to a maximum extent. The amount of such initial or preparatory compression of air may be relatively high without in any way adversely affecting the carrying out of my invention, as will later be clearly evident.

Substantially all available space within each cylinder 17, that is, space which is not needed for other purposes, is filled by a stationary two-part filler member 54. It might be noted that this filler member is thus made in two parts joined flatwise together in abutting relation, as shown in Figure 4, merely because of the exigencies of manufacturing and assembling. The plane of the section in Figure 1 passes through both of these filler member parts 54—54, while in Figure 2 the plane of the section passes between them, with one of them thus shown in elevation. It is evident that the vertical dividing plane between these two filler member parts 54—54 could be different, for example, at right angles to that shown in the drawings. These two filler member parts 54—54 function as a single member.

This filler member 54, as a whole, is in general cylindrical and extends from the lower end of the cylinder 17 upwardly within the cylinder and into the lower end portion of the tubular piston 35, with the latter at its uppermost position, shown in Figure 2, and there terminates at a level which will provide clearance for the closed upper end or head of the piston when the latter has descended to its lowermost position.

Clearance is also provided around this filler member for the tubular portion of the piston 35, which telescopes over this stationary filler member 54. Each filler member part 54 is provided at its lower end with an outer flange 55 which is shown as circularly rounded at its ends and as cut away or outwardly flattened along its opposite edges between its ends. This flange 55 is shown as fixedly bolted to the lower end of the cylinder 17, within the top of the crank-case compartment 52, as shown in Figure 2.

This filler member 54 is provided with a downwardly flaring slot 56, half of which is formed in each of its parts 54—54, as is shown in the drawings. This slot 56 extends vertically through the filler member 54 and at its lower end extends outwardly into the flange 55 flush with the inner surface of the cylinder 17. Above this flange 55, flaring portions of this slot 56 cut through the cylindrical outer surface of this filler member 54, thus producing opposite lateral openings at 57—57. This slot 56 provides clearance for the connecting rod 38 and for its angular movement.

Each of the filler-member parts 54—54 is further provided with a vertical slot 58 which extends downwardly to a limited extent from its upper end, these latter slots 58—58 being disposed in a vertical plane at right angles to the downwardly flaring slot 56. These latter slots 58—58 have opposed parallel sides and are shown as being of the same width as the space provided between the upper ends of the downwardly flaring walls of the slot 56.

These latter slots 58—58 accommodate the downward movement of the wrist pin 37, together with the ends of the bearing 59 on the upper end of the connecting rod 38 and the opposed bosses 60—60 around the opposite ends of the wrist pin 37 and formed within and upon the tubular piston 35. The upper end portion of this filler member 54 is of outwardly reduced diameter at 61 in order to provide a space for the reception of the internal annular shoulder 36 formed within the upper end portion of the piston 35.

It is to be noted that the element 54 functions as more than simply a space-reducing filler member. The stationary filler member 54, over which the piston 35 telescopes, further functions as an air-pumping device in cooperation with the relatively movable piston 35. When the piston 35 rises, the space therein, then vacated by the filler member 54, becomes filled with air drawn in through the cylinder port 51. In the succeeding downward stroke of the piston 35, this air is expelled therefrom, as this piston moves telescopically over the filler member 54.

It is desirable to keep down the weight of the engine as a whole as much as possible. For that reason it is desirable to make the filler member 54 of relatively light material, such as aluminum or a suitable aluminum alloy, so that the weight of the engine will be increased only by a negligible amount.

As the piston 35 descends, the air within it, as this air becomes compressed, will be expelled therefrom downwardly through the downwardly flaring filler member slot 56, and also to some extent around this air-pumping filler member. The air beneath the lower edges of the piston 35 at the same time will be expelled through the openings 57—57 into the lower portion of the downwardly flaring slot 56, as well as also past the straight outer edges of the filler member flange 55. All of this expelled air will enter and be compressed within the corresponding crank-case chamber or compartment 52.

It is to be noted in this connection that the air-pumping filler member 54 stirs or agitates the air within the piston 35. Also this filler member 54 functions to displace and expel heated air from within the piston and to replace this expelled heated air with cooler air. This is of special importance with respect to the overheated air within the upper end of the piston. This manner of functioning of the air-pumping filler member 54 is thus of substantial advantage in cooling and preventing over-heating of the pistons 35—35.

It will now be evident from Figures 1 and 2 that when any one of the pistons 35—35 is at the lowermost limit of its downward travel, then substantially all of the air which has been taken in through the cylinder port 51 has now been compressed in the corresponding crank-case compartment 52, and in the slots 56 and 58—58 of the described filler member 54, with perhaps the major portion of this compressed air within the crank-case compartment 52.

In the carrying out of my invention, the air pre-compression space within the crank-case chamber or compartment 52 is shown in the drawings as reduced substantially to a maximum extent by means of a pair of similar filler discs 62—62. Both of these filler discs 62—62 are fixed upon the crank-shaft 39 to rotate therewith and are respectively disposed longitudinally of the engine at opposite sides of the connecting rod 38 and in transverse alignment with the crank-arms 40—40.

Each of these filler discs 62—62 is provided with a deep radial or diametrical slot 63 which extends suitably beyond the center of this disc. This slot 63 fits closely over the crank-arm 40, from the inner end of the latter adjacent to the crank-shaft 39, and extends outwardly beyond the crank-pin 41. The periphery of the disc 62 is shown in Figures 1 and 2 as being flush with the adjacent outer end of the crank-arm 40. In order to anchor the disc 62 firmly upon the crank-arm 40, it is desirable that it be shrunk thereon.

Other means are also shown for fixedly securing the disc 62 upon the crank-arm 40. A fillister-headed bolt 64, having its head countersunk into the periphery of the disc 62, passes radially inward through this disc and at its inner end screws into the inner end of the crank-arm 40, at the bottom of the slot 63, and thus firmly clamps the disc 62 in place with the bottom of its slot 63 firmly abutting against this inner end of the crank-arm 40, which is desirably made, as shown, slightly longer than usual and of sufficient length for effectively serving this purpose.

Another fillister-headed bolt 65, having its head countersunk and provided with a countersunk nut, passes tangentially through the peripheral portion of the disc 62, across the outer end portion of its slot 63, and through the outer end portion of the crank-arm 40, outwardly beyond the crank-pin 41. This tangentially transverse bolt 65 strengthens the slotted disc 62 so as to prevent the possibility of its being split by centrifugal force when rotated at a high speed. Also this bolt 65 draws the opposed faces of the slot 63 into a yet more firm clamping engagement with the interposed crank-arm 40. For keeping down weight, these filler discs 62—62 should be made of a relatively light material, such as aluminum or a suitable alloy of aluminum.

Each of the crank-case compartments 52—52 is provided at the lowermost portion of its bottom with a valve-controlled eduction port 66 which extends horizontally tangentially from the circularly curved crank case 42—43 and opens outwardly toward the manifold side of the engine. This port 66 is of elongated width longitudinally of the engine, as is shown in dotted lines in Figure 1, for four of these ports 66—66. Each of these ports is there indicated as being substantially of the full width of the crank-case compartment 52, in the direction of the length of the crank-shaft 39.

An outwardly opening check-valve is suitable for use to control this eduction port 66 and in the drawings such a check-valve 67 is shown as conveniently and effectively being of the flap type. This check-valve 67 is hinged and pivotally supported along its upper edge by suitable hinge means.

A pair of spaced lower hinge leaves 68—68 are fixed upon the valve member 67. These hinge leaves 68—68 could be made in one piece with the valve member 67 if so desired. A pair of similarly spaced upper hinge leaves 69—69 are secured upon the outer face of the lower crank-case part 43. The lower hinge leaves 68—68 are respectively connected with the upper hinge leaves 69—69 by means of two similar axially aligned spaced sets of hinge knuckles 70—70, and a single pivot pin or pintle 71 which passes through all of the hinge knuckles 70—70 and thus across the intervening space between the two sets of these knuckles. This hinge pin 71, in the space between the sets of hinge knuckles 70—70, is surrounded by a valve-closing torsion spring 72 having a tendency to close the flap valve 67 and to maintain this valve at its closed position shown in the drawings.

The swinging valve member 67 is shown as flat and of oblong rectangular shape, corresponding to the shape of the eduction port 66. The flat inner marginal face of the valve member 67 surrounds the mouth of the port 66, and is adapted to abut flatwise against a flat seating face there provided, as clearly shown in Figures 2, 7, and 8. These abutting sealing faces of the valve member 67 and its seat normally carry thereon a film of oil. This film of oil cushions the valve member 67, at the termination of its closing movement, as well as also assures the forming of an air-tight seal. By adherence and viscosity, this interposed film of oil has a tendency to resist the opening movement of the valve member 67 and to cause it to stick upon its seat in its closed position.

In carrying out my invention in a practical manner, means are provided for overcoming the mentioned tendency of this valve to stick and providing for its relatively free disengagement from its seat in its opening movement. A continuous inner groove 73 is provided in the marginal seating face of the valve 67, intermediately of the outer edge of the valve plate 67 and the mouth of the port 66. A series of relief openings 74—74 extend through the valve plate 67 into communication with this endless groove 73. Thus the seating margin of the valve plate 67 outwardly beyond the groove 73 forms a cushioning surface, while the seating margin inwardly from this groove 73 forms both a cushioning and a sealing face for the valve plate 67 on its described seat.

The endless groove 73 and openings 74—74 provide for the free entrance of air between the opposite edges of two relatively narrow oil films against which the valve plate 67 is seated, as described, thus preventing the formation of a vacuum over a more extensive or wider surface. This admitted air thus greatly lessens the tendency of the valve plate 67 to stick and renders it capable of being disengaged from its seat and opened by a correspondingly less pressure of compressed air in the eduction port 66.

It might be here noted that, instead of hinged spring-pressed flap valves 67—67, a different type of check-valve could be used. Also, instead of check-valves, positively operated valves could be employed, and be operated in proper timed relation from a convenient moving part of the engine, such as the crank-shaft 39, or the cam shaft 33. However, the disclosed flap valves 67—67 effectively serve their intended purpose.

While the piston 35 is moving upward, it will cause the check-valve 67 to be maintained at its closed position. In the downward movement of the piston 35, after the air beneath it has been sufficiently compressed, the pressure of this air will open the check valve 67. Compressed air together with oil, which has run down from the various bearings of the engine into the crank-case compartment 52, will both be expelled at the same time from the compartment 52 through the eduction port 66, past the opened check-valve 67.

This compressed air, together with the oil, is delivered into a combined oil and compressed air storage chamber 75, which extends throughout the length of the engine and is common to all of the crank-case compartments 52—52. This storage chamber 75 extends beneath and upwardly along the lower crank-case part 43 at the manifold side of the engine.

The bottom, two opposite sides, and the ends of this storage chamber are shown in the form of an elongated pan or trough 76. The extreme top of this chamber is shown as formed by a horizontal flange plate 77, in the same piece with and extending outwardly from the upper crank-case part 42. The lower crank-case part 43 also forms a part of the top or cover for this storage chamber 75. The lower member 76 of this chamber is shown as bolted to the bottom of the crank-case 43 and to the flange plate 77.

The compressed air within the storage chamber 75 is maintained under a suitable maximum pressure, above the accumulated oil 78. As needed by the engine, this pre-compressed air is fed to the carburetor 10 and the intake manifold 15 by means of a feed pipe 79, under the control of a regulating valve, this precompressed air being first passed through an oil separator, as will be described later.

A two-part cover or enclosure 80 is provided for the check-valves 67—67 outwardly therefrom, being secured to the lower crank-case part 43. The two valve cover parts 80—80 have closed ends at the front and rear ends of the engine, and have open ends spaced apart opposite to each other substantially at the middle of the engine.

These valve covers 80—80 effectively prevent the submergence of any of the check-valves 67—67 with the oil 78 collected in the bottom of the pressure chamber 75 when the engine is tilted endwise, as in going up or down a hill in the case of an automobile, or in the similar tilting of an aircraft or marine engine, while at the same time compressed air from any of the valve-controlled eduction ports 66—66 may enter the compression chamber 75 between the spaced inner ends of these valve covers. Submergence of the check-valves 67—67 in oil obviously would interfere with their operation and would obstruct the passage of compressed air through the eduction ports 66—66.

In carrying out my invention, an oil pump 81 for lubricating the various bearings of the engine is disposed within the pressure chamber 75 near its bottom. This oil pump may be of any suitable or usual construction, and is adapted to be driven in a usual or any suitable way by means of a shaft 82, shown as housed within a tube 83. The pump forces this oil under pressure through a main pipe line 84 to and through the various engine bearings, in a usual way. The major portion of this oil comes from the bearings into the crank-case chambers 52—52 from which it is expelled by the compressed air, as above described.

It is now evident that there must be no freely open or uncontrolled communication between the initial air-intake chamber 49 and the described compression space within each cylinder 17 within and beneath the tubular piston 35, and within the crank-case compartment 52, it being usual to have a cam shaft housing which freely opens directly into the usual crank-case.

In carrying out my invention, the wall of the upper part 42 of the crank-case forms also a part of the cam shaft housing 46 and segregates the tubular space or channel 85 formed within the cam shaft housing 46 from all of the crank-case compression compartments 52—52.

The cam shaft housing 46 is closed at its rear end, as shown at the left in Figure 1, while at the front end of the engine this cam shaft housing 46 opens freely into the timing gear housing 45. Oil from the channel 85 of the cam shaft housing 46 thus may drain into the upper portion of the timing gear housing 45 and lubricate the timing gears, such as the gear 44. Gasoline fumes which enter the timing gear housing 45 may pass therefrom freely back along the cam shaft housing channel 85 and thus into the initial air-intake chamber 49, out of which they will be drawn through the cylinder ports 51—51 along with the air to be compressed and fed to the engine.

Means are provided for removing the oil which collects in the bottom of the timing gear housing 45. In the particular engine shown in the drawings, this accumulated oil is passed through a usual form of check-valve 86 into the bottom portion of the forward crank-case compartment 52, toward which this check-valve opens.

In the ascending movement of the piston 35, the vacuumized effect produced in the forward crank-case compartment 52 will draw in this oil. The downward air-compressing stroke of this piston 35 will cause the compressed air, as it passes through the valve-controlled eduction port 66, to eject any oil there may be in this crank-case compartment into the compression chamber 75, where it joins the oil 78.

At the rear end of the crank-shaft 39, oil from the engine bearings may collect within a chamber formed by a rear housing 87. A usual form of check-valve 88, similar to the check-valve 86, opens from within the lower portion of the housing 87 into the lower portion of the rearmost crank-case compartment 52. Oil is drawn through the check-valve 88 into this rearmost crank-case compartment 52 and ejected therefrom in the same manner as described with reference to the forward crank-case compartment 52 and check-valve 86.

The top of this rear oil-collecting housing 87 is shown as connected with the initial air-intake chamber 49 by means of a pipe 89. The purpose of this connection 89 is to draw off gasoline fumes from the oil-collecting chamber 87 into the initial intake chamber 49. Such fumes have a tendency to collect in this rear chamber 87, which may be due, in part at least, to their leakage around the crank-shaft 39. Thus such fumes are prevented from escaping into the air and are used as fuel in the engine.

It is obvious that instead of the pipe 89 an internal freely open port could be provided through the outer portion of the cylinder block directly from the rear chamber 87 into the initial intake chamber 49.

It might be noted that, instead of utilizing the vacuumized condition of the crank-case compartments 52—52 for drawing off accumulated oil from the front and rear housing chambers 45 and 47, other suitable means could be employed for this purpose, although the disclosed means operate satisfactorily.

The top cover plate 77 of the air compression chamber 75 is provided with an air outlet opening 90 through it into the lower end of the feed pipe 79. When the engine is running and especially when it is running fast, there are likely to be particles of oil carried in the air within the pre-compression chamber 75. Such oil particles do not always have sufficient time to settle into the bed of oil 78 in the bottom of this chamber 75. It is, of course, undesirable to have these particles carried by the draught of air into the combustion chambers 20—20.

It is similarly undesirable that oil vapor should be carried into the combustion chambers 20—20. The compressed air discharged from any crank-case compartment 52 through the delivery valve 67 into the precompression chamber 75 is more or less in the form of both a spray and a vapor.

In carrying out my invention an oil separator 91, shown in Figures 1, 2, and 3, is provided.

This oil separator is required to remove large quantities of oil spray and oil vapor from a stream of expanding compressed air which commonly is moving through it at high speed. If this were not done efficiently the engine would burn too much oil, thus making this type of supercharging particularly objectionable. Therefore, a specialized form of oil separator is required which will be capable of operating efficiently under these particular conditions.

This oil separator 91 is shown as comprised of five straight successively connected pipes, 92, 93, 94, 95 and 96, joined together at right angles to each other. The free end of the first pipe 92 is open and provides an inlet from the chamber 75 immediately beneath its cover plate 77. A short funnel-shaped outlet pipe 97 extends upwardly from the free end portion of the terminal pipe 96 and opens through the cover plate opening 90 into the lower end of the feed pipe 79.

Each of the successively connected pipes 92 to 96 inclusive has a relatively short extension 98 projecting beyond the pipe into which it opens, including the terminal pipe 96 with reference to its outlet pipe 97. Each of these pipe extensions 98—98 is closed at its outer end and is provided with a relatively short downwardly extended oil drain tube 99. The lower end of each of these tubes 99—99 is adapted to be opened and closed by a spring-closed swinging valve member 100 pivoted upon the lower end of this tube.

As the draught of compressed air, carrying with it particles of oil, passes successively through the pipes 92 to 96 inclusive, the right-angle turn from each pipe into the next succeeding pipe and finally into the outlet funnel 97, will have a tendency to cause the oil particles, by reason of their greater weight, to pass beyond this turn into the corresponding pipe extension 98, from which the oil will be drained into the tubes 99—99 and for the time being trapped and held therein by the upwardly spring-pressed closed valves 100—100. When sufficient oil has accumulated in any one of these tubes 99—99, its weight will cause the spring-closed valve 100 to open and this oil will drop into the oil 78 in the bottom portion of the compression chamber 75.

The long tube formed by the successively connected pipes 92, 93, 94, 95 and 96 acts as a condenser for the oil vapor. The rush of commonly rapidly expanding compressed air through this long tube has a tendency to cool it. When the oil vapor comes in contact with the walls of this tube it is condensed back into oil.

This oil condensate is carried to the blind ends of the tube pipes 92 to 96 inclusive. At the right-angle turn such oil will be removed, as above described with reference to the oil particles and will be similarly returned therewith into the precompression chamber 75, there to form a portion of the stored lubricating oil 78.

As already mentioned, the precompressed air within the air-receiving compression or storage chamber 75 is to be maintained under a suitable maximum pressure, although it is to be understood that this maximum pressure may vary somewhat under different operating conditions. In order to supercharge the engine, this pressure, of course, must be higher than the prevailing atmospheric pressure.

It should now be evident that the engine, and particularly its filler members 54—54 and 62—62, may be readily so designed as to produce a desired suitable predetermined pressure of air within this air-receiving chamber 75. This chamber 75 forms a source of supply of compressed air to be fed through the carburetor 10 into the combustion chambers 20—20, there producing the desired supercharging effect.

In practically carrying out my invention, means are provided for regulating and controlling the volume and pressure of the compressed air which is allowed to pass from the supply chamber 75 into the combustion chambers 20—20, in accordance with the demands of the engine under any particular conditions of operation or different desired engine speeds.

In the engine illustrated in the drawings, a regulating valve 101, shown as of the butterfly type, is disposed within the feed pipe 79 between the oil separator outlet 97 and the carburetor 10. This regulating valve 101 is fixedly carried by a valve-operating shaft 102, journaled in a usual way in bearings provided by the opposite side walls of the feed pipe 79, beyond which one end of this shaft extends to a considerable distance, as shown in Figure 1.

It is obvious that with this valve at its closed position, as shown in Figure 2, no draught of compressed air can then pass out of the air supply chamber 75 through the carburetor intake pipe 79, although of course some gradual leakage is to be expected past this closed valve. It is evident that with this valve in its fully open position, indicated by broken lines in Figure 2, a greater volume of compressed air will be fed to the combustion chambers 20—20 when the engine is running fast, while should the engine be running slowly with this valve then fully open, the combustion chambers 20—20 would then be supercharged at a higher pressure.

In carrying out my invention, both manual means and automatically actuated means are provided for operating this regulating valve 101, each of such valve-operating means being adapted to move the valve 101 independently of and without disturbing the other one of such valve-operating means. A differential mechanism of a specialized form has been employed for this purpose.

It is to be understood that this movement-transmitting differential mechanism may be readily varied in construction as to the number, form and arrangement of its parts, while still being adapted for effectively operating in a substantially similar manner. It is also within the scope of my invention to employ a different or any suitable type of valve-operating mechanism for actuating this regulating valve 101 in the desired manner as mentioned.

In the particular construction shown in the drawings, a lever arm 103 fixed upon the valve shaft 102 carries a bevel gear or pinion 104 journaled upon its outer end portion. Two similar gear segments 105 and 106 are loosely pivoted upon the valve shaft 102 at opposite sides of the arm 103 and have bevel gear teeth in engagement respectively with the opposite sides of the pinion 104. These gear segments 105 and 106 are provided respectively with similar segmental spur gear portions 107 and 108.

The segmental gear element 105 is adapted to be individually rocked by a slidably guided rack bar 109 having toothed engagement with its segmental spur gear portion 107, while the other segmental gear element 106 is adapted to be independently rocked by another similar slidably guided rack bar 110 having toothed engagement with its segmental spur gear portion 108.

The rack bars 109 and 110 are valve-actuating members and any rocking movement of the regulating valve 101 produced by slidably moving one of these rack bars will be superimposed upon any rocking movement of this regulating valve produced by a sliding movement imparted to the other rack bar. One of these rack bars is adapted to be moved by manually actuated means, while the other similar rack bar is adapted to be moved by automatically actuated means, as will be described later. In the construction shown, as so far described, it is evident that it is immaterial which one of these rack bars is to be manually actuated, or automatically actuated.

Means including a bellows device are provided for automatically operating the rack bar 110. This device has a frame part comprising a bed plate 111, secured upon the top of the engine frame flange plate 77, an outer front end plate 112 and an inner or rear end plate 113; also a cover 114 is provided, thus forming a bellows-containing casing. The front plate 112 has a bearing 115 through which the slidable rack bar 110 is guided.

The inner end of this rack bar is secured to a movable front head plate 116 of a bellows 117, having a stationary rear head plate 118 fixed upon the rear frame plate 113. The bellows head 116 is pressed rearwardly by a thrust spring 119 which abuts against the front frame plate 112. A tube 120 opens into the bellows 117, through the rear frame plate 113 and the stationary bellows head 118, and into the exhaust manifold 24. This tube 120 provides free communication between the inside of the bellows 117 and the inside of the exhaust manifold 24.

An increase in pressure of the exhaust gases within the exhaust manifold 24 will expand the bellows 117 and move its movable head 112 against the opposing force of the spring 119, while a decrease in pressure of the exhaust gases will allow the spring 119 to move the bellows head 112 in the opposite direction and contract the bellows 114. In each instance, movement of the bellows head 112 moves the slidable rack bar 110 in one direction or the other.

When the engine is running fast, producing more pressure within the exhaust manifold 24, the regulating valve 101 will then be opened more widely. This feeds the combustible mixture in larger volume to the combustion chambers 20—20 and at a desirable supercharging pressure, which will usually be less than the maximum pressure of the precompressed air contained within the air supply chamber 75.

When the engine is running slowly, with lower pressure within the exhaust manifold 24, the spring 119 will become effective for moving the regulating valve 101 toward its closing position, thereby decreasing the amount of the precompressed supercharged combustible mixture fed into the combustion chambers 20—20. This prevents overcharging the engine at low speeds.

The other slidable rack bar 109 is shown as having a head 121 upon one of its ends adapted to receive a suitable connection through which this rack bar may be moved manually by any suitable means. The means shown for operating this rack bar 109 comprise a hand lever 122, carrying a movable finger piece 123 having a connection 124 to a detent member 125 adapted to have locking engagement in a notched or toothed rack segment 126.

An operating rod 127, pivotally connected to the handle lever 122, is connected through any suitable intermediary operating connections (not shown) with the head 121 of the valve-operating rack bar 109. Thus this rack bar 109 may be manually moved to and set at any desired stationary position. It is evident that the movement of this rack bar 109 will rock the regulating valve 101 either toward its open or closed position as may be desired, independently of the described automatic means and irrespective of the position which the other rack bar 110 may occupy at the time.

The described automatically acting means and manually acting means, for operating the rack bars 109 and 110, are so designed and proportioned in cooperative relation with each other that either of these means will be effective for transmitting to the regulating valve 101 a complete movement between its entirely closed and its fully open position. The required amount of movement of the respective rack bars 109 and 110, for thus fully moving the regulating valve 101, will depend upon the radius of the respective segmental spur gears 107 and 108, as will be readily understood.

The regulating valve 101 will be stopped against further movement at its fully opened position, by a boss 116—A, fixed upon the outer side of the bellows head 116, coming into abutting contact with the guide bearing 115 carried by the outer end frame part 112, while this valve will be stopped at its closed position by reason of its abutment against the opposite walls of the feed pipe 79.

It is evident that it is desirable to have both manually operated and automatically operated controlling means for the regulating valve 101, each adapted to operate in a similar way independently of the other, as disclosed. Such manually operated means provide, among other things, for adjusting the position of the regulating valve 101 in accordance with different barometric pressures of the atmosphere, also in accordance with different weather conditions which, as is well known, affect the operation of an internal combustion engine, such for example as, conditions of atmospheric temperature and humidity.

The described bellows device has a particular advantage as an actuating means, since it eliminates any possibility of leakage of exhaust gases from it.

It is to be noted that the regulating valve 101 is automatically operated exclusively by change of pressure in the exhaust gases. For example, such operation is independent of the supercharging pressure in the intake manifold 15, which at times may exceed that in the exhaust manifold 24.

It is to be further noted, as is now evident that the regulating valve 101 is never entirely closed while the engine is running, but only when the engine is stopped. This valve 101 controls only the supercharging pressure. It has no control over the speed of the engine. That is controlled by means of the throttle valve 12, or by other suitable means. The speed of the engine automatically controls the regulating valve 101, as described. This automatic control is subject to the superimposed manual control, as also described.

It will now be evident that the pressure within the engine intake ports 18—18 around the stems 26—26 of the intake valves 25—25 will be greater than that within the initial intake chamber 49, by reason of the described supercharging compression of the air fed to the engine through the supply pipe 79 and carburetor 10.

An advantageous result of the disclosed construction is that any gasoline fumes which may pass through the upper valve stem guide 27 will be received within the initial air-intake chamber 49, from which they will be drawn through the engine port 51 and fed back as a portion of the engine fuel. This manner of operation results in both a saving of fuel and the elimination of gasoline odors around the engine, since there is thus no leakage of these fumes into the atmosphere.

It will be noted that the intake air, in passing through heated parts of the engine, from the initial intake chamber 49 into the precompression air feed supply chamber 75, will be warmed or preheated, which, of course, is an advantage in effecting vaporization and combustion, as is well known.

Should the pressure of precompressed air within the supply chamber 75 become equal to the maximum pressure which the descending pistons 35—35 are capable of producing in the crankcase compartments 52—52, compressed air will then be delivered through the eduction ports 66—66 only in sufficient quantity to feed the engine in accordance with its requirements, under the control of the described regulating valve 101, while this maximum pressure of precompressed air will be maintained within the supply chamber 75.

Similarly, the ascending pistons 35—35 will draw in only the required amount of air through the cylinder intake ports 51—51 to replace that which is being used by the engine from the precompression supply chamber 75. The suction, however, under all conditions is sufficient to draw oil out of the timing gear housing 45 through the check-valve 86 and similarly out of the rear housing 87 through the similar check-valve 88, as described.

Thus, under these conditions, as well as similarly under other conditions, just the proper amount of air which the engine needs is precompressed, such amount being neither too much nor too little, although varying from time to time, in accordance with the control, both automatic and manual, of the regulating valve 101.

Thus, it will be seen that when any piston 35 is at the lower limit of its stroke, then the pressure of the precompressed air within its crank-case compartment 52 will be substantially equal to that within the supply chamber 75. The downward stroke of the piston 35 is not only cushioned by compressed air within the crank-case compartment 52, but such compressed air aids in starting the piston on its succeeding upward stroke, and the greater this compression happens to be under any particular working conditions, then the more it will be of assistance in moving the piston upwardly, so that thus no power of the engine is wasted under any working conditions, while the cushioning of the pistons 35—35 lessens vibration and wear.

Attention is directed to the evident fact that there will be two precompressions of air for each precompressed charge of combustible mixture fed into the combustion chambers 20—20, and that the precompression feature of my invention is fully effective at all engine speeds, and is especially so at low speeds.

During those periods when the engine is not running, it is desirable that little or no compressed air should be contained either within the crank-case compartments 52—52 nor within the air supply chamber 75. It is obvious that such relief of pressure will make starting easier and put less strain on the starter.

Also, relieving this pressure when the oil pump is not running, relieves the oil 78 of pressure, so that this oil then cannot be gradually forced by its pressure through the oil pump 81 by leakage through the latter and thus be forced through the main oil line delivery pipe 84 and through the various engine bearings into the crank-case compartments 52—52, from which too much of it would then reach the engine cylinders 17—17, which would cause smoking in starting the engine, as well as be otherwise objectionable.

Also elimination of air pressure within the air supply chamber 75 prevents leakage of precompressed air past the regulating valve 101, by which the pressure beyond this valve and within the combustion chambers 20—20 would gradually become equalized with that within this chamber 75, which would then result in the engine being overcharged when it is started.

In carrying out my invention, automatically acting means are provided for venting compressed air from the air supply chamber 75 when the engine stops running and for maintaining this pressure of compressed air throughout the time while the engine continues to run.

In the particular construction shown in the drawings, the precompression supply chamber 75 is provided with a vent port 128 opening outwardly through its cover plate 77. This vent port 128 may be opened or closed by an outwardly opening valve 129 having an outer stem 130, the other end of which carries a piston 131 within an outer casing 132 fixed upon the upper side of the cover plate 77. A thrust spring 133, interposed between the top of the cover plate 77 and the piston 131, tends constantly to open the valve 129. An oil pressure tube 134 communicates with the casing 132 above the piston 131 and at its other end is connected into communication with the main oil supply pipe 84.

Whenever the engine is running, pressure of oil in the tube 134, from the running oil pump 81, acting upon the piston 131 in opposition to the valve-opening spring 133, will keep the vent valve 129 in closed position relatively to the vent port 128, as is shown in Figure 1. When the engine stops running, this spring 133, acting upon the other side of the piston 131, will force the oil out of the casing 132 back through the tube 134 into the main oil supply pipe 84, in which there will now be no pressure, due to the fact that the oil pump 81 is not running. At the same time, this spring 133 moves the valve 129 to a position which opens the vent port 128. Compressed air within the crank-case compartments 52—52 and within the air supply chamber 75 is now free to escape through the open port 128 and a vent tube 136 in communication with the casing 132 between the cover plate 77 and the piston 131. This air vent tube 136 is shown in Figures 1 and 2 as opening into the atmosphere.

The operation of the above particularly described self-supercharged four-cycle internal combustion engine of my invention has been described in connection with the description of the construction.

It is obvious that various modifications may be made in the construction shown in the drawings and above particularly described, within the principle and scope of my invention as defined in the appended claims.

I do not limit myself specifically to minor details, to size, materials, relative proportions, nor particular arrangement of parts, as illustrated in the accompanying drawings and particularly described, these being given simply as a means for clearly describing the internal combustion engine of my invention.

What I claim is:

1. In a multi-cylinder four-cycle internal combustion engine, in combination, an intake passage for each of said cylinders, an initial air-intake chamber, a supercharger interposed between said chamber and said passages in multiple, a cylinder intake valve in control of each of said passages and having a stem extended into said chamber, and a guide for said valve stem between said intake passage and said chamber, from which latter vaporous gasoline mixture passing from said supercharged passage through said guide will be fed back through said supercharger.

2. In a multi-cylinder four-cycle internal combustion engine, in combination, an individual crank-case compartment for each of said engine cylinders, an air-pressure chamber common to all of said crank-case compartments, an engine piston within each of said cylinders, means combined with each of said crank-case compartments adapted to cause said piston to compress air in said compartment and deliver it therefrom into said chamber, a conduit connecting said chamber with the engine intake manifold, a carburetor interposed in said conduit, a regulating valve in said conduit movable to different intermediate positions between a fully open position and a conduit-closing position, automatically acting means adapted to move said valve and to be operated by means of variations in pressure of the engine exhaust gases to impart an opening movement to said valve when such pressure is increasing and a closing movement when such pressure is decreasing, manually movable means capable of moving said valve and adapted to be set at different stationary positions, and an interconnected differential mechanism whereby each of said valve-moving means is adapted to move said valve independently of the other said valve-moving means.

3. In a multi-cylinder four-cycle internal combustion engine, in combination, an individual crank-case compartment for each of said engine cylinders, an air-pressure chamber common to all of said crank-case compartments, an engine piston within each of said cylinders, means combined with each of said crank-case compartments adapted to cause said piston to compress air in said compartment and deliver it therefrom into said chamber, a conduit connecting said chamber with the engine intake manifold, a carburetor interposed in said conduit, a regulating valve in said conduit movable to different intermediate positions between a fully open position and a conduit-closing position, automatically acting means adapted to move said valve and to be operated by means of variations in pressure of the engine exhaust gases to impart an opening movement to said valve when such pressure is increasing and a closing movement when such pressure is decreasing, manually movable means capable of moving said valve and adapted to be set at different stationary positions, and an interconnected differential mechanism whereby each of said valve-moving means is adapted to move said valve independently of the other said valve-moving means, said automatically acting means including a bellows device with the interior of its bellows in free communication with the exhaust manifold of the engine.

4. In a multi-cylinder four-cycle internal combustion engine, in combination, an individual crank-case compartment for each of said engine cylinders, an engine piston within each of said cylinders, an air-pressure chamber common to all of said crank-case compartments, means combined with each of said crank-case compartments adapted to cause said piston to compress air in said compartment and deliver it therefrom into said chamber together with oil from said crank-case compartment, a cam shaft housing closed against communication with any of said crank-case compartments, a timing gear housing into which one end of said cam shaft housing opens and into which oil from said cam shaft housing is adapted to drain, and means adapted to remove accumulated oil from said timing gear housing into said air-pressure chamber, said oil-removing means including a check-valve opening from said timing gear housing into an adjacent one of said crank-case compartments, said cylinder having an air-intake port adapted to be uncovered by said piston during the terminal portion of the movement of the latter away from said crank-case compartment, thus producing a vacuum adapted to draw said oil through said check-valve into said crank-case compartment.

5. In a multi-cylinder four-cycle internal combustion engine, in combination, an individual crank-case compartment for each of said engine cylinders, an engine piston within each of said cylinders, an air-pressure chamber common to all of said crank-case compartments, means combined with each of said crank-case compartments adapted to cause said piston to compress air in said compartment and deliver it therefrom into said chamber, a supercharging conduit connecting said chamber with the engine intake manifold, a cam shaft housing closed against communication with any of said crank-case compartments, a timing gear housing into which one end of said cam shaft housing opens, and an initial air-intake chamber common to all of said cylinders and with which said cam shaft housing freely communicates, thus providing for the free passage of gasoline vapor from said timing gear housing through said cam shaft housing into said initial air-intake chamber.

6. In a multi-cylinder four-cycle internal combustion engine, in combination, an individual crank-case compartment for each of said engine cylinders, an engine piston within each of said cylinders, an air-pressure chamber common to all of said crank-case compartments, means combined with each of said crank-case compartments adapted to cause said piston to compress air in said compartment and deliver it therefrom into said chamber, valve means adapted to prevent return of compressed air from said chamber into said crank-case compartment, a supercharging conduit connecting said chamber with the engine intake manifold, a housing enclosing the engine crank-shaft at one end of the engine, and an initial air-intake chamber forming a collective intake passageway for all of said cylinders and with which the top of said housing freely communicates and thereby providing for the free passage of gasoline vapor from said housing into said initial air-intake chamber.

7. In a multi-cylinder four-cycle internal combustion engine, in combination, an individual crank-case compartment for each of said engine cylinders, an engine piston within each of said cylinders, an air-pressure chamber common to all of said crank-case compartments, means combined with each of said crank-case compartments adapted to cause said piston to compress air in said compartment and deliver it therefrom into said chamber together with oil from said crank-case compartment, a supercharging conduit connecting said chamber with the engine intake manifold, said means combined with said crank-case compartments including an air and oil delivery valve from each of said crank-case compartments into said air-pressure chamber, and a valve cover within said chamber common to all of said delivery valves, said valve cover being closed at the opposite ends of the engine and freely opening into said chamber intermediately of the length of the engine thus to prevent the submergence of said delivery valves in oil in an endwise tilted position of the engine.

8. In a multi-cylinder four-cycle internal combustion engine, in combination, an individual crank-case compartment for each of said engine cylinders, an engine piston within each of said cylinders, an air-pressure chamber common to all of said crank-case compartments, means combined with each of said crank-case compartments adapted to cause said piston to compress air in said compartment and deliver it therefrom into said chamber, valve means adapted to prevent return of compressed air from said chamber into said crank-case compartment, a supercharging conduit connecting said chamber with the engine intake manifold, a regulating valve in control of said conduit and movable to different intermediate positions between a fully open position and a conduit-closing position, said air-pressure chamber having an air-venting port adapted to provide for the escape of compressed air from said chamber, a vent valve in control of said port and adapted to be moved between port-opening and port-closing positions, and automatically acting valve-actuating means controlled by the engine and adapted to maintain said vent valve in closed position while the engine is running and to move said valve to and maintain it at its open position when the engine stops running, said valve-actuating means comprising energy-storing means adapted to move and having a constant tendency to move said vent valve to one of its port-controlling positions, and means operated by the engine adapted to overcome said energy-storing means and to move said vent valve to its other port-controlling position.

9. In an internal combustion engine, in combination, an air-pressure chamber, a supercharger adapted to deliver compressed air into said chamber, a conduit connecting said chamber with the engine intake, a carburetor interposed in said conduit, a regulating valve in control of said conduit and movable to different intermediate positions between an open position and a closed position, manual actuating means for said valve adapted to be set at different stationary positions, automatically acting actuating means for said valve controlled by the speed of the engine and adapted to impart an opening movement to said valve when such speed is increasing and to impart a closing movement to said valve when such speed is decreasing, and means whereby each of said valve-actuating means is adapted to actuate said valve independently of and without disturbing the other said valve-actuating means.

10. In an internal combustion engine, in combination, an air-pressure chamber, a supercharger adapted to deliver compressed air into said chamber, a conduit connecting said chamber with the engine intake, a carburetor interposed in said conduit, a regulating valve in control of said conduit and movable to different intermediate positions between an open position and a closed position, manual actuating means for said valve adapted to be set at different stationary positions, automatically acting actuating means for said valve controlled by the speed of the engine and adapted to impart an opening movement to said valve when such speed is increasing and to impart a closing movement to said valve when such speed is decreasing, and means whereby each of said valve-actuating means is adapted to actuate said valve independently of and without disturbing the other said valve-actuating means, said latter means comprising an interconnected differential mechanism.

11. In a multiple-cylinder four-cycle internal combustion engine, in combination, an individual crank-case compartment for each of said engine cylinders, an engine piston within each of said cylinders, a combined air-pressure and oil-storage chamber common to all of said crank-case compartments, means combined with each of said crank-case compartments adapted to cause said piston to compress air in said compartment and deliver it therefrom into said chamber together with oil from the bottom of said crank-case compartment, valve means adapted to prevent return of compressed air from said chamber into said crank-case compartment, a cam shaft housing extending adjacent the outside of all of said crank-case compartments, said cam shaft housing being closed along its bottom against downward passage of oil therefrom and being closed throughout its length against communication with any of said crank-case compartments, and means adapted to remove oil from said cam shaft housing into said chamber against the pressure of compressed air within the latter.

12. In a multiple-cylinder four-cycle internal combustion engine, in combination, an individual crank-case compartment for each of said engine cylinders, an engine piston within each of said cylinders, a combined air-pressure and oil-storage chamber common to all of said crank-case compartments, means combined with each of said crank-case compartments adapted to cause said piston to compress air in said compartment and deliver it therefrom into said chamber together with oil from the bottom of said crank-case compartment, valve means adapted to prevent return of compressed air from said chamber into said crank-case compartment, a supercharging conduit connecting said chamber with the engine intake manifold, a cam shaft housing extending adjacent the outside of all of said crank-case compartments, said cam shaft housing being closed along its bottom against downward passage of oil therefrom and being closed throughout its length against communication with any of said crank-case compartments, an oil-collecting timing gear housing into which one end of said cam shaft housing opens and into which oil from said cam shaft housing is adapted to drain, and means adapted to remove accumulated oil from said timing gear housing into said chamber against the pressure of compressed air within the latter.

13. In a multi-cylinder four-cycle internal combustion engine, in combination, an individual crank-case compartment for each of said engine cylinders, an engine piston within each of said cylinders, an air-pressure chamber common to all of said crank-case compartments, means combined with each of said crank-case compartments adapted to cause said piston to compress air in said compartment and deliver it therefrom into said chamber together with oil from said crank-case compartment, valve means adapted to prevent return of compressed air from said chamber into said crank-case compartment, a cam shaft housing closed against communication with any of said crank-case compartments, a timing gear housing into which one end of said cam shaft housing opens and into which oil from said cam shaft housing is adapted to drain, and means adapted to remove accumulated oil from said timing gear housing into said air-pressure chamber, said oil-removing means including a check-valve opening from said timing gear housing into an adjacent one of said crank-case compartments, and means combined with said adjacent crank-case compartment adapted to cause said piston to produce a vacuum in said compartment which will draw said oil from said housing through said check-valve into said compartment.

14. In a multi-cylinder four-cycle internal combustion engine, in combination, an individual crank-case compartment for each of said engine cylinders, an engine piston within each of said cylinders, an air-pressure chamber common to all of said crank-case compartments, means combined with each of said crank-case compartments adapted to cause said piston to compress air in said compartment and deliver it therefrom into said chamber together with oil from said crank-case compartment, valve means adapted to prevent return of compressed air from said chamber into said crank-case compartment, an oil-collecting housing enclosing the engine crank-shaft at one end of the engine, and means adapted to remove accumulated oil from said oil-collecting housing into said air-pressure chamber, said oil removing means including a check-valve opening from said housing into an adjacent one of said crank-case compartments, said cylinder having an air-intake port adapted to be uncovered by said piston during the terminal portion of the movement of the latter away from said crank-case compartment, thus producing a vacuum adapted to draw said oil through said check-valve into said crank-case compartment.

15. In a multi-cylinder four-cycle internal combustion engine, in combination, an individual crank-case compartment for each of said engine cylinders, an engine piston within each of said cylinders, a combined air-pressure and oil-storage chamber common to all of said crank-case compartments, means combined with each of said crank-case compartments adapted to cause said piston to compress air in said compartment and deliver it therefrom into said chamber together with accumulated oil from the bottom of said crank-case compartment, valve means adapted to prevent return of compressed air from said chamber into said crank-case compartment, a supercharging conduit connecting said chamber with the engine intake manifold, a regulating valve in control of said conduit and movable to different intermediate positions between a fully open position and a conduit-closing position, an oil pump adapted to be operated by the engine, said pump having an oil intake communicating with the bottom portion of said chamber and having an outlet for oil under pressure, said chamber having an air-venting port adapted to provide for the escape of compressed air from said chamber, a vent valve in control of said port and adapted to be moved between port-opening and port-closing positions, and valve-actuating means for said vent valve comprising energy-storing means adapted to move and having a constant tendency to move said vent valve to its port-opening position, and means adapted to utilize oil under pressure from the outlet of said oil pump to overcome said energy-storing means and to move said vent valve to its port-closing position.

16. In a multi-cylinder four-cycle internal combustion engine, in combination, an individual crank-case compartment for each of said engine cylinders, an engine piston within each of said cylinders, a combined air-pressure and oil-storage chamber common to all of said crank-case compartments, means combined with each of said crank-case compartments adapted to cause said piston to compress air in said compartment and deliver it therefrom into said chamber together with accumulated oil from the bottom of said crank-case compartment, valve means adapted to prevent return of compressed air from said chamber into said crank-case compartment, a supercharging conduit connecting said chamber with the engine intake manifold, a regulating valve in control of said conduit and movable to different intermediate positions between a fully open position and a conduit-closing position, an oil pump adapted to be operated by the engine, said pump having an intake communicating with the bottom portion of said chamber and having an outlet for oil under pressure, a main oil-delivery pipe leading from the outlet of said oil pump, said chamber having an air-venting port adapted to provide for the escape of compressed air from said chamber, a vent valve in control of said port and adapted to be moved between port-opening and port-closing positions, and valve-actuating means comprising a casing, a movable member within said casing extending across the latter and forming a movable closure wall therefor therein, a connection between said member and said vent valve adapted to cause each to partake of the movement of the other, a valve-opening spring adapted to have a constant tendency to move said vent valve to its port-opening position while concomitantly moving said movable member in one direction, and an oil-pressure tube connecting said main oil-delivery pipe with said casing at the side of said movable member which will cause oil pressure to oppose said valve-opening spring and adapted to overcome said spring and maintain said valve at its port-closing position.

17. In a multi-cylinder four-cycle supercharged internal combustion engine, in combination, an individual crank-case compartment for each of said engine cylinders, an engine piston within each of said cylinders, means combined with each of said crank-case compartments adapted to cause said piston to compress air in said compartment and deliver it therefrom, an air pressure chamber common to all of said crank-case compartments and adapted to receive compressed air therefrom and to hold such compressed air under a maximum pressure limited only by the capacity of the engine to effect further precompression of air into this chamber, valve means adapted to prevent return of compressed air from said chamber into said crank-case compartment, a supercharging conduit connecting said chamber with the engine intake manifold, a pressure-reducing regulating valve in said conduit movable to different intermediate positions between an open position and a closed position and thereby being adapted to maintain compressed air in said chamber at a pressure substantially higher than the supercharging pressure, and actuating means for said regulating valve controlled by the speed of the engine to impart an opening movement to said regulating valve when such speed is increasing and to impart a closing movement to said regulating valve when such speed is decreasing.

CHARLES ECKER.